(12) United States Patent
Klebanoff

(10) Patent No.: US 7,580,891 B2
(45) Date of Patent: Aug. 25, 2009

(54) METHOD AND SYSTEM FOR ASSISTING IN THE IDENTIFICATION OF MERCHANTS AT WHICH PAYMENT ACCOUNTS HAVE BEEN COMPROMISED

(75) Inventor: Victor Franklin Klebanoff, Waccabuc, NY (US)

(73) Assignee: Mastercard International Incorporated, Purchase, NY (US)

( * ) Notice: Subject to any disclaimer, the term of this patent is extended or adjusted under 35 U.S.C. 154(b) by 1029 days.

(21) Appl. No.: 10/339,847

(22) Filed: Jan. 10, 2003

(65) Prior Publication Data

US 2004/0034604 A1 Feb. 19, 2004

Related U.S. Application Data

(60) Provisional application No. 60/348,076, filed on Jan. 10, 2002.

(51) Int. Cl.
G06Q 40/00 (2006.01)
(52) U.S. Cl. .............................. 705/44; 705/38; 705/39
(58) Field of Classification Search .................... 705/44
See application file for complete search history.

(56) References Cited

U.S. PATENT DOCUMENTS

| | | | |
|---|---|---|---|
| 5,754,632 A * | 5/1998 | Smith .................... 379/114.14 |
| 5,819,226 A | 10/1998 | Gopinathan et al. ............ 705/1 |
| 5,884,289 A | 3/1999 | Anderson et al. ............. 705/44 |
| 6,094,643 A | 7/2000 | Anderson et al. ............. 705/44 |
| 6,254,000 B1 * | 7/2001 | Degen et al. ................. 235/380 |
| 6,330,546 B1 * | 12/2001 | Gopinathan et al. ........... 705/35 |
| 6,430,305 B1 * | 8/2002 | Decker ....................... 382/116 |
| 7,263,506 B2 * | 8/2007 | Lee et al. ...................... 705/38 |
| 2002/0099649 A1 * | 7/2002 | Lee et al. ...................... 705/38 |
| 2002/0133721 A1 * | 9/2002 | Adjaoute .................... 713/201 |
| 2004/0034604 A1 * | 2/2004 | Klebanoff .................... 705/65 |

* cited by examiner

*Primary Examiner*—Alexander Kalinowski
*Assistant Examiner*—Lindsay M. Maguire
(74) *Attorney, Agent, or Firm*—Baker Botts LLP

(57) ABSTRACT

A method and system for identifying merchants at which payment accounts (e.g., credit card accounts) have been compromised. A set of "pre-fraud" payment accounts is first identified, the pre-fraud accounts being compromised accounts previously used to conduct legitimate transactions. A set of suspect merchant accounts is selected, wherein transactions with each of the suspect merchant accounts have been conducted with no fewer than a threshold number of the pre-fraud payment accounts, and wherein at least a threshold percentage of the business transacted with the merchant was transacted using pre-fraud payment accounts. Once selected, the suspect merchant accounts can be subjected to further investigation.

8 Claims, 8 Drawing Sheets

METHOD AND SYSTEM FOR ASSISTING IN THE IDENTIFICATION OF MERCHANTS AT WHICH PAYMENT ACCOUNTS HAVE BEEN COMPROMISED

CROSS-REFERENCE TO RELATED APPLICATIONS

This application claims priority to U.S. Provisional Patent Application Ser. No. 60/348,076, entitled "Method and System for Assisting in the Identification of Merchants at which Payment Accounts Have Been Compromised," filed on Jan. 10, 2002, which is incorporated herein by reference in its entirety.

REFERENCE TO COMPUTER PROGRAM LISTING APPENDIX

A computer program listing appendix is submitted with this application on two identical compact discs, one being the primary compact disc and the other being a duplicate thereof. All of the material on the discs is incorporated herein by reference. Each compact disc contains the following files:

| Title | Size | Date Created |
|---|---|---|
| tcppanly.doc | 104 KB | Jan. 9, 2003 |
| tcppqual.doc | 80 KB | Jan. 9, 2003 |

BACKGROUND OF THE INVENTION

This invention relates to a method and system for assisting in the prevention of fraud in a payment card environment. More particularly, the present invention relates to a method and system for detecting merchants at which payment accounts such as credit card accounts may have been compromised—i.e., at which the payment account information may have been stolen.

In today's marketplace, payment cards—such as credit and debit cards—are ubiquitous methods of payment. These payment cards may be issued by individual card companies or by financial institutions that are members of a payment organization (such as MasterCard International Incorporated). As used in this application, the term "payment card" includes not only physical payment cards, but also virtual payment cards in which the payment account information is stored in digital or electronic form, such as in a digital wallet. Each payment card is typically associated with a payment account.

During the past several years, a problem of growing concern to the payment card industry has been the compromising of payment account information in order to facilitate fraudulent transactions. For example, there have been numerous press reports on the exploits of Internet hackers who, in a single theft, have stolen the account data of ,thousands of accounts from merchant web sites. The account data may include payment account number, expiration date, cardholder name, and/or cardholder billing address. The stolen account data may then be used at direct merchants (e.g., mail-order, phone-order, and Internet-order merchants) to conduct fraudulent transactions. Another type of account compromise referred to as "skimming" is also a problem. Skimming is the process of copying a payment card's magnetic stripe information with an electronic reader. Since the magnetic stripe contains encrypted data for the purpose of verifying a card's authenticity, skimming permits criminals to manufacture counterfeit cards that cannot be distinguished from genuine cards by an issuer's authorization system.

Cases of account number compromise typically occur in clusters at certain merchants because of these merchants' sloppy security practices, employees of merchants acting in a criminal capacity, and/or the merchants themselves colluding with criminals. To prevent further fraud, it is important to identify the merchant locations at which account compromise has occurred. These merchant locations are commonly referred to as "points of compromise" or "common points of purchase." Because a payment card has typically been used in valid transactions at many merchants by a cardholder once fraud has been detected, it is usually difficult to determine the point of compromise for the account.

For several years, however, sophisticated payment card issuers have performed "triangulation" analyses to identify common points of purchase for skimmed counterfeit cards. To perform these analyses, the issuers first identify payment accounts with which fraudulent transactions were conducted through point of sale (POS) terminals while the legitimate cardholders continued to have possession of their cards. Next, for each account used for fraud, the valid transactions preceding the fraud are identified. Transactions across all accounts are then compared to identify merchants at which more than one account was used in valid transactions. These merchants are designated as possible points of compromise ("PPOCs"). Other factors may be applied to narrow the list of PPOCs. For example, a merchant at which a high percentage of accounts handled had counterfeit fraud is more likely to be a PPOC than a merchant at which a low percentage of accounts handled had counterfeit fraud—assuming that each merchant transacted with a similar number of payment accounts. Payment accounts with few valid transactions prior to the fraudulent activities on the accounts may provide better evidence of points of compromise than accounts with many valid transactions prior to fraudulent activities on the accounts. Once the PPOCs are identified, subsequent investigation of each PPOC is required to confirm the identification of a merchant as a point of compromise.

For a card issuer to successfully apply the triangulation method described above, it is necessary that the issuer identify counterfeit fraud reliably and rapidly and have a sufficiently large number of accounts compromised at the same merchant. In the 1980's, MasterCard recognized that identification of PPOCs could be facilitated by analyzing transaction data from multiple issuers. A larger transaction database can furnish more complete information than the database available to a single issuer. Therefore, MasterCard implemented a system to identify PPOC using fraud reported to MasterCard by issuers and valid transaction data processed by MasterCard in its function of settling its members' accounts.

SUMMARY OF THE INVENTION

It is therefore an object of the present invention to provide a system and method for reliably and rapidly identifying potential points of compromise of payment accounts.

It is a further object of the present invention to identify possible points of compromise based on all transaction data that are available for analysis at a particular point in time, without requiring issuers to provide historical account transaction information after fraud has been detected on payment accounts.

To accomplish these and other objects, the present invention utilizes payment account transaction data (such as the transaction data collected by payment networks) and fraud data (such as data provided by card issuers to payment associations). From the data, payment accounts with fraudulent transactions are selected. For each such payment account used in fraudulent transactions, the "pre-fraud transactions"—i.e., the valid transactions conducted prior to the first fraudulent usage on the account—made during a selected time period are identified. For reference, payment accounts having pre-fraud transactions are referred to as "pre-fraud" payment accounts to distinguish them among the other accounts transacted at a merchant that do not include any fraudulent activity. According to the present invention, merchants which are potential points of compromise are identified based on the pre-fraud account activities at the merchants. According to a preferred embodiment of the present invention, a merchant is identified as a potential point of compromise based on:

a. whether the number of pre-fraud accounts used at a merchant exceeds a predetermined threshold number; and b. during a given time period (for example, on any given date), the number of pre-fraud accounts used at a merchant exceeds a predetermined minimum percentage of the total number of accounts used at the merchant.

The percentage in paragraph (b) may depend on the number of pre-fraud accounts transacted at the merchant during the given time period. The list of merchants that are identified as potential points of compromise can be refined based on other heuristic and statistical criteria.

BRIEF DESCRIPTION OF THE DRAWINGS

Exemplary embodiments of the present invention will now be described in detail with reference to the accompanying drawings in which.

DETAILED DESCRIPTION OF THE INVENTION

Figure 1:
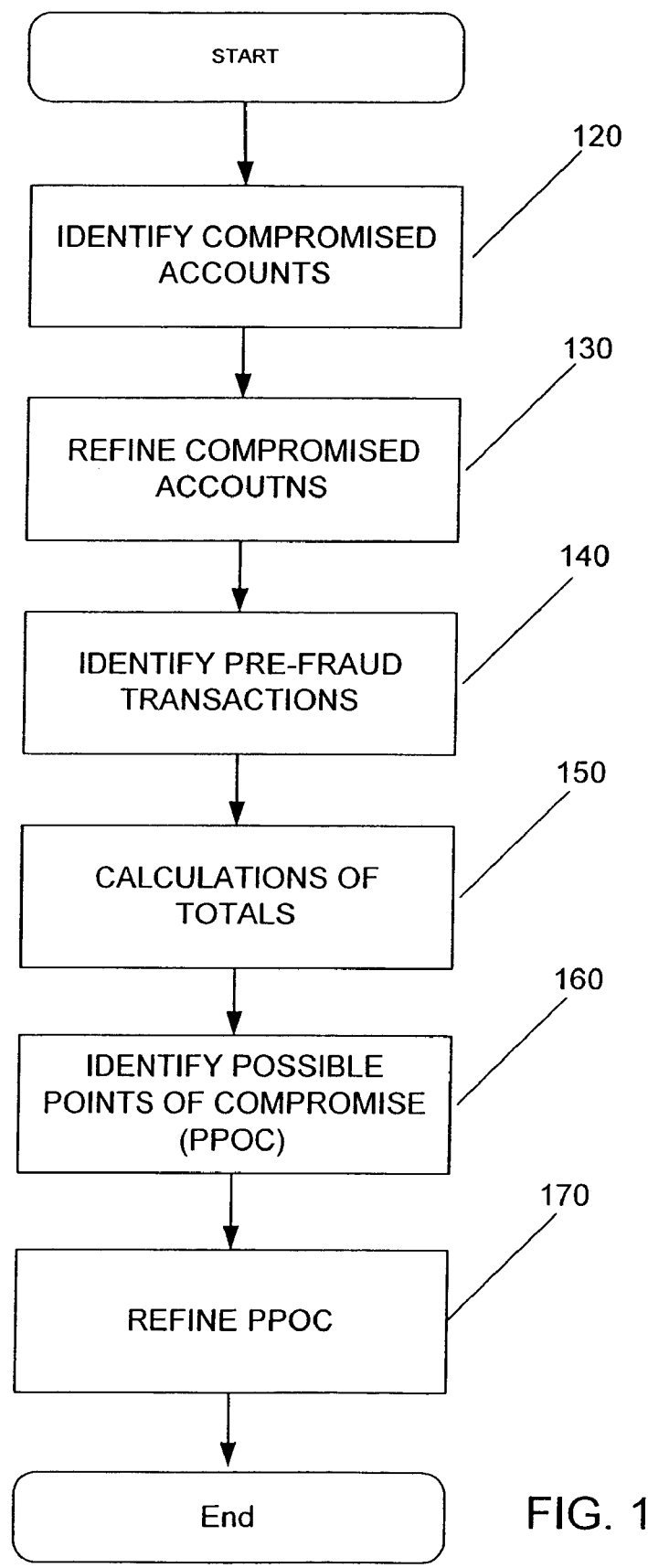
FIG. 1 is a flow diagram illustrating an exemplary procedure for identifying possible points of compromise according to the present invention.

FIG. 1 is a flow chart of a procedure for identifying possible points of compromise ("PPOCS") according to a preferred embodiment of the present invention. The procedure is preferably performed periodically—e.g., once per week—in a continuing succession of analysis cycles. The illustrated procedure utilizes payment card transaction data (such as the data collected by payment networks) and fraud data (such as counterfeit fraud data reported by issuers to payment associations). These data may be maintained in two separate data sets or databases, or may be combined into a larger data set or database. For ease of use, the data can be sorted by payment account number, merchant name, acquirer bank ID (an alphanumeric code), merchant category code (MCC), and/or transaction date, and may be summarized—for example, daily counts can be taken of transactions and number of accounts transacted by merchant name, acquirer bank ID and MCC.

Using the fraudulent transaction database(s), payment accounts having fraudulent transactions of a certain type (e.g. counterfeit) during a predetermined time period are identified (step 120). For reference in this specification, these accounts will be called the "compromised accounts."

Optionally, the set of compromised accounts is refined by identifying those accounts in which there are valid, non-fraudulent transactions for at least a predetermined time period prior to the first reported fraudulent transaction in an account—i.e., those compromised accounts for which there is a "clean window" of valid transactions conducted before the first reported fraudulent transaction (step 130).

For each compromised account, transactions performed prior to the date of the first fraudulent transaction and later than a predetermined start date are identified (step 140). For reference, these transactions will be called "pre-fraud transactions" and payment accounts with pre-fraud transactions will be called "pre-fraud" payment accounts to distinguish them among the other accounts transacted at a merchant.

Next, a calculation of the total transactions associated with one or more predetermined classifications is performed (step 150). For example, for each merchant occurring in the pre-fraud transactions, the total number of transactions performed at the merchant is calculated—in the event that the merchant performs transactions under more than one merchant category code, the total number of transactions performed at the merchant under each merchant category code is calculated—and the transaction totals are computed for each date occurring in the pre-fraud transactions at that merchant. The totals calculated in this step are used as denominators to determine percentages later.

In accordance with the present invention, a merchant can be defined by more than one parameter. For example, a merchant can be defined by the parameters of merchant name and MCC, since some merchants have multiple MCCs depending on the type or location of transactions. For example, transactions at a gas station may have a different MCC depending on whether they are conducted inside the gas station or at the pump. Since payment cards handled inside the gas station are more likely to be compromised than those used at the pump, it is helpful to treat these two situations differently for the purpose of analysis.

Next, in step 160, selected merchants are identified as possible points of compromise (PPOC), and the associated merchant accounts are identified as suspect merchant accounts. A merchant can, for example, be identified as a potential point of compromise based on whether:

a. the number of pre-fraud accounts used at a merchant exceeds a minimum number of accounts; and b. on a given date or set of dates, the number of pre-fraud accounts used at a merchant exceeds a minimum percentage of the total number of accounts used at the merchant.

The aforementioned minimum percentage may be dependent on the number of pre-fraud accounts. As an example, a merchant can be identified as a potential point of compromise if:

three (3) or more pre-fraud accounts were transacted at the merchant; and
on any date:
  when exactly one (1) pre-fraud account was transacted at the merchant, the total number of accounts transacted did not exceed 50 (i.e, the number of pre-fraud accounts transacted was at least 2% of all accounts transacted); or
  when exactly two (2) pre-fraud accounts were transacted at the merchant, the total number of accounts transacted did not exceed 133 (i.e, the number of pre-fraud accounts transacted was at least 1.5% of all accounts transacted); or
  when three (3) or more pre-fraud accounts were transacted at the merchant, the total number of accounts transacted did not exceed 100 times the number of pre-fraud accounts (i.e, the number of pre-fraud accounts transacted was at least 1% of all accounts transacted).

In step 170, the list of merchants that are PPOC may optionally be refined based on heuristic and statistical criteria. The heuristic and statistical criteria for refining the PPOC can include, for example, the following parameters:

number of pre-fraud accounts transacted in total by a merchant; and
maximum number of pre-fraud accounts transacted during a given time period (for example, on any single day or during any thirty-day interval).

Figure 3:
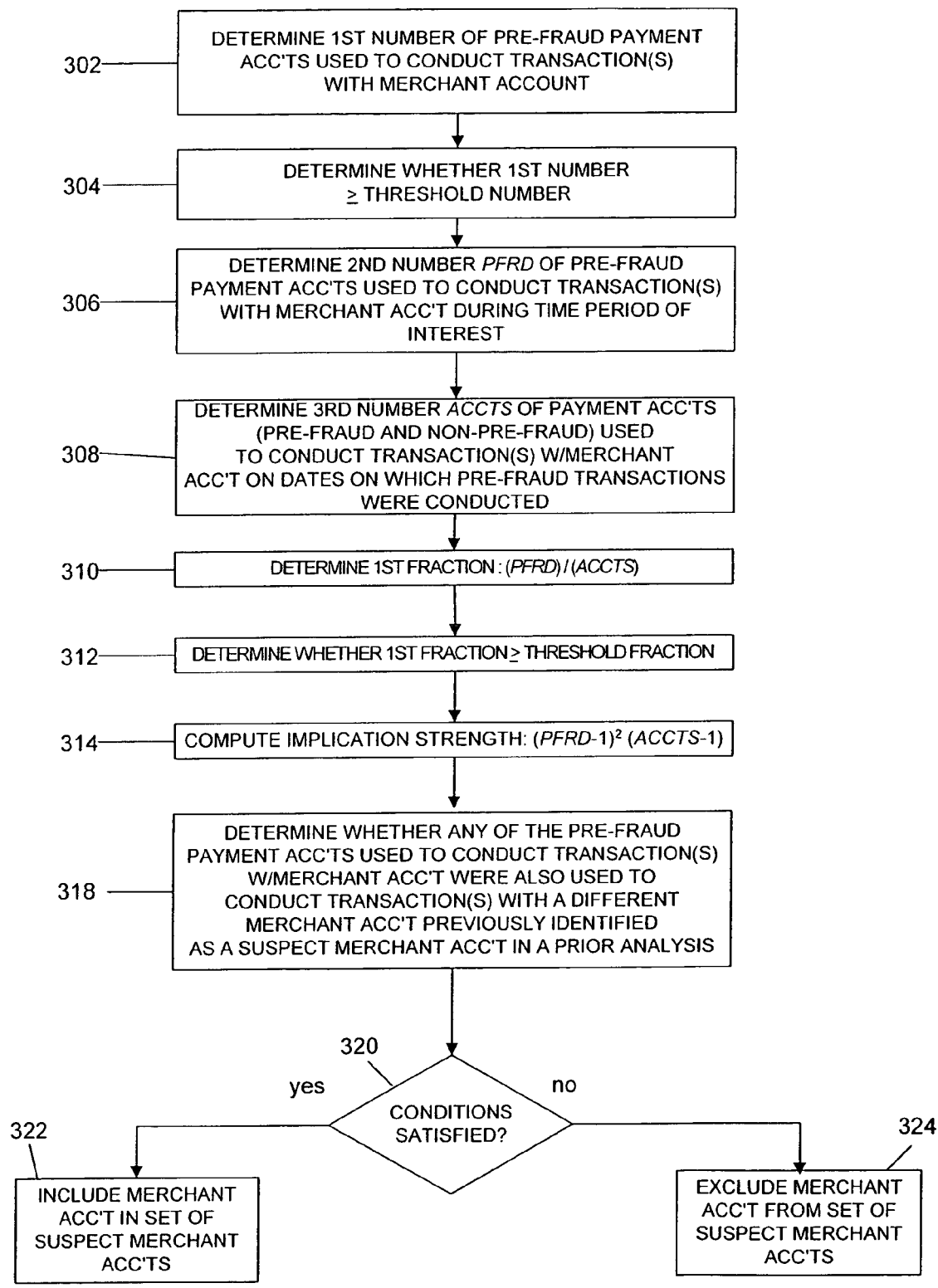
FIG. 3 is a flow diagram illustrating an exemplary procedure for identifying suspect merchant accounts in accordance with the present invention.

FIG. 3 illustrates an exemplary procedure for identifying PPOCs and their associated suspect merchant accounts in step 160 of the procedure illustrated in FIG. 1. In the procedure illustrated in FIG. 3, the number of pre-fraud payment accounts used to conduct transactions with a merchant account being evaluated is determined (step 302). The procedure next determines whether the number of pre-fraud accounts used to conduct transactions with the merchant account is greater than or equal to a threshold number (step 304). The number pfrd of pre-fraud payment accounts used to conduct transactions with the merchant account during the time period of interest is determined (step 306). The procedure also determines the number accts of payment accounts (both pre-fraud and non-pre-fraud) used to conduct transactions with the merchant account on the dates on which the pre-fraud transactions were conducted (step 308). In most cases, account transaction statistics are available for each date individually. As a result, for an analysis covering more than one date, it is typically easiest to derive pfrd and/or accts by computing, for each of these two numbers, a sum of the respective statistics from each date. For example, on each date, a certain number of pre-fraud payment accounts may have been used to conduct transactions with a merchant account. Pfrd is easily calculated by simply adding these numbers for the dates of interest. Similary, on each date, a total number of payment accounts (both pre-fraud accounts and other payment accounts) may have been used to conduct transactions with the merchant account. Accts is easily calculated by simply adding these numbers for the dates of interest. However, if one or more payment accounts were used more than once on the set of dates covered by the calculation, these payment accounts will be counted more than once in the computation; this is particularly likely to occur when computing accts, which usually includes a greater number of accounts than pfrd. Yet, in any case, pfrd (the number of pre-fraud accounts) and accts (the total number of accounts), even if not exact, are typically accurate enough for the purposes of this analysis.

Referring again to FIG. 3, a first fraction (pfrd)/(accts) is determined (step 310). Step 312 then determines whether the first fraction is greater than or equal to a threshold fraction. An implication strength is computed in step 314 using the formula $(pfrd-1)^2/(accts-1)$. The procedure then determines whether any of the pre-fraud payment accounts used to conduct transactions with the merchant account were also used to conduct transactions with a different merchant account previously identified as a suspect merchant account in a prior analysis (step 318). Whether or not the merchant account is included (step 322) or excluded (324) from the set of suspect merchant accounts depends upon whether one or more conditions are satisfied (step 320). These conditions can include, for example, the following:

the number of pre-fraud payment accounts used to conduct transactions with the merchant account is no less than the threshold number discussed above;
the first fraction is no less than the threshold fraction discussed above;
the implication strength associated with the merchant account is no less than a threshold value; and/or
none of pre-fraud payment accounts used to conduct transactions with the merchant account being evaluated were also used to conduct transactions with a second merchant account previously identified as a suspect merchant account in a prior analysis.

Figure 2:
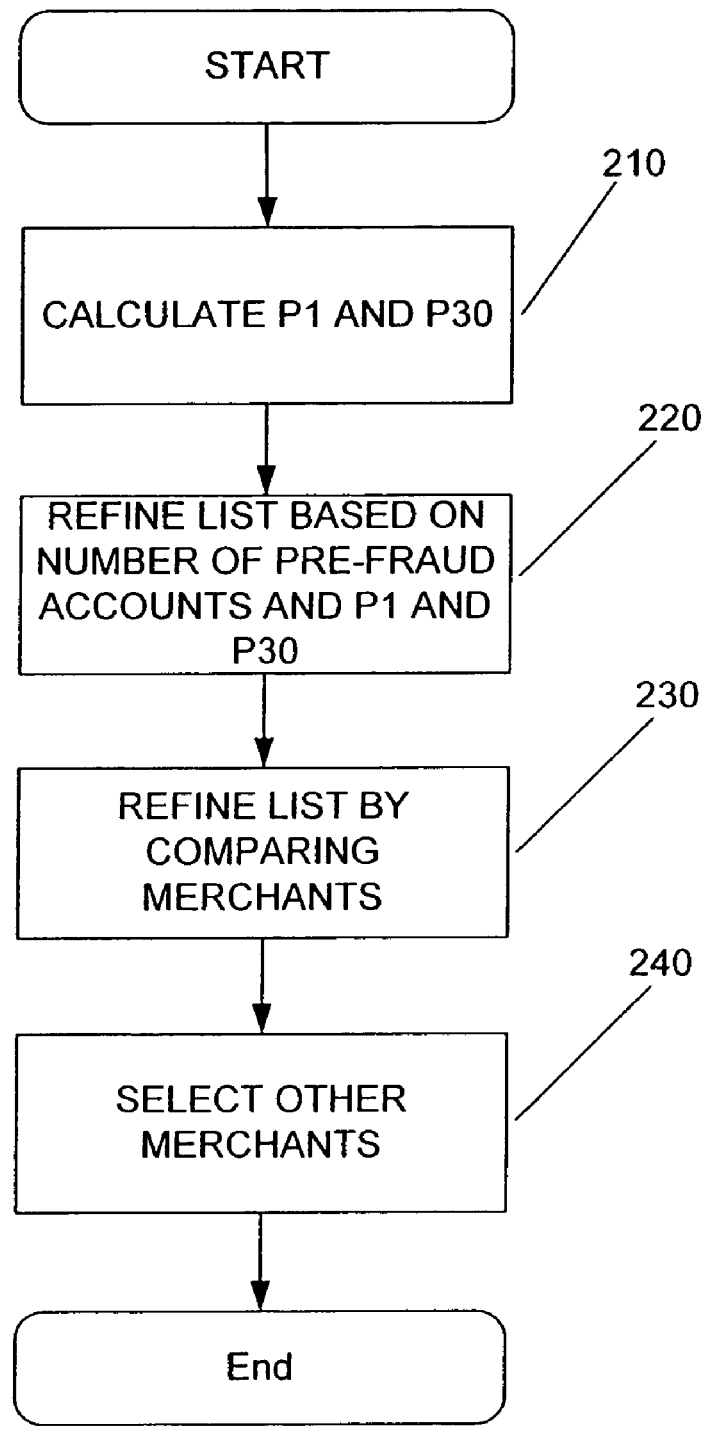
FIG. 2 is a flow diagram illustrating an exemplary procedure for refining a set of merchant accounts that have been identified as possible points of compromise according to the present invention.

FIG. 2 illustrates an exemplary procedure for refining the set of suspect merchant accounts in step 170 of the procedure illustrated in FIG. 1. Referring to FIG. 2, step 210 calculates the parameters $p_1$ and $p_{30}$ for each merchant account identified as suspect, $p_1$ and $p_{30}$ being defined as follows:

$p_1$=maximum number of pre-fraud accounts transacted at a merchant on a single date
$p_{30}$=maximum number of pre-fraud accounts transacted at a merchant within a thirty-day time period In step 220, the list of suspect merchant accounts is refined by retaining only the accounts of merchants that satisfy at least one of the following conditions:

10 or more pre-fraud accounts were used at a merchant;
4-9 pre-fraud accounts were used at a merchant AND (($p_1>1$) OR ($p_{30} \geq 0.5*pfrd$)), where pfrd=the number of pre-fraud accounts used at the merchant; and
3 pre-fraud accounts were used at a merchant AND ($p_{30}=3$)

Steps 210 and 220 provide a large refined list of merchants at which payment account data may have been compromised. Information sharing with issuers and payment organizations—which compile and distribute lists of actual, confirmed skimming points—suggests that, typically, very few confirmed points of compromise are missing from the list produced by step 220.

An additional concern is the rate of false positives. Typically, 10% of the merchants in the list resulting from step 220 are ultimately confirmed as actual points of compromise. That is, 90% of the listed merchants are not actual points of compromise, which is an undesirably high false positive rate. The false positive rate can be reduced by considering how many payment accounts implicate each merchant, and how strongly the respective payment accounts implicate each merchant. For example, consider that step 220 produces a list of merchants and/or merchant accounts, along with a list of payment accounts responsible for the listing of each merchant or merchant account. Suppose that merchant M is listed because payment accounts 1, 2, 3, 4, and 5 were transacted at M and that subsequent fraud transactions were performed on each of these accounts. In this event, let us say that accounts 1-5 implicate merchant M. It is possible, in fact highly probable, that several—if not all—of the accounts 1-5 also implicate merchants P, Q, and R. It is even possible that account 1 was compromised at multiple merchants, such as M and P. However, it is unlikely that every account that implicates multiple merchants was compromised at all of the merchants. Therefore, each account that implicates multiple merchants is preferably assigned to the merchant(s) which seems/seem to be the most likely point(s) of compromise. In some cases, a tie between merchants may occur, and a payment account can be assigned to multiple merchants. In any event, merchants are preferably retained in the list of PPOCs if a sufficient number of the accounts implicate them and are ultimately assigned to them.

One technique common to steps 230 and 240—discussed in further detail below—may conveniently be introduced here. The list produced by step 160 is based on pre-fraud transactions performed during a specified period. For example, in a particular cycle of analysis, steps 120-160 can process transactions conducted during a 17-week period ending on the date of the analysis cycle—or, optionally, on an earlier date. Suppose that step 220 indicates that payment account 1 implicates merchant M, but that payment account 1 was in fact compromised at another merchant—e.g., merchant P—on an earlier date—e.g., 22 weeks prior to the last date of the time period currently being analyzed. Merchant P is not necessarily included in the output of step 220. However, any previous evidence that payment account 1 was, in fact, compromised at merchant P should be used in order to avoid listing merchant M as a PPOC, unless of course there is other strong evidence that merchant M is a point of compromise. Suppose that an analysis performed in a previous cycle—e.g., a cycle performed 6 weeks earlier than the current cycle—implicated merchant P by including merchant P in the output of step 160. Merchant P can be compared to merchant M, in terms of which merchant account is more strongly implicated by payment account 1. If merchant P is more strongly implicated than M, the evidence for listing merchant M is reduced.

Figure 4:
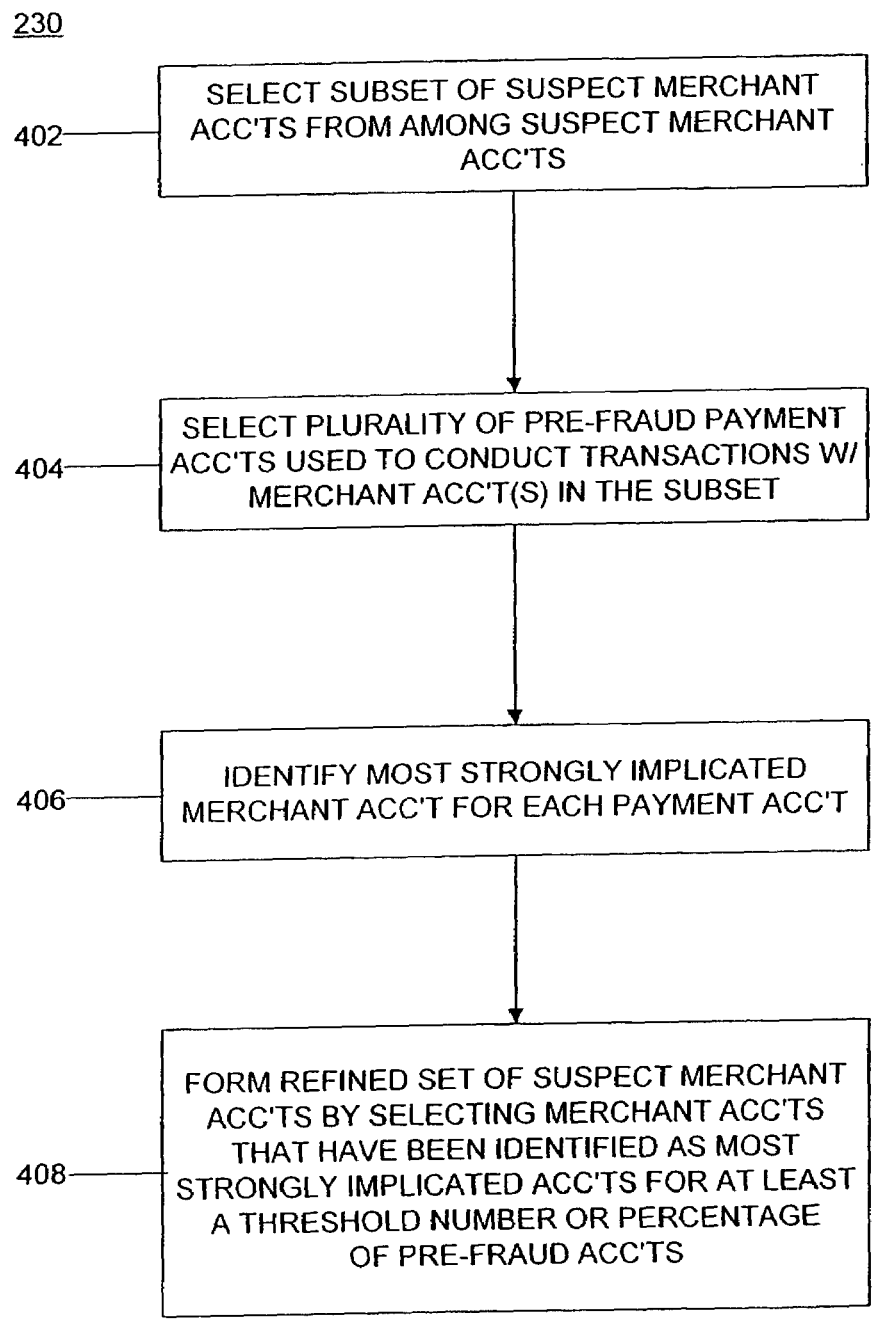
FIG. 4 is a flow diagram illustrating an exemplary procedure for refining a set of suspect merchant accounts in accordance with the present invention.

A merchant implicated by payment accounts that implicate no other merchants is typically more likely to be the actual location at which the payment accounts were compromised, compared to a merchant implicated by payment accounts that also implicate other merchants. On the other hand, even if a payment account implicates more than one merchant, one of the merchants may be more strongly implicated than the others. FIG. 4 illustrates an exemplary procedure for further refining the set of suspect merchant accounts in step 230 (FIG. 2) by selecting only merchant accounts that are the most strongly implicated by each pre-fraud payment account. As an initial refining step, the procedure identifies, and retains in a subset of merchant accounts, only those merchant accounts implicated by—i.e., having conducted transactions with—two or more payment accounts that do not implicate any other merchant accounts (step 402). This restricted subset of merchants typically includes approximately 25% of the suspect merchant accounts output from step 220. All pre-fraud payment accounts implicating—i.e., used to conduct transactions with—any of the merchant accounts in the subset selected in step 402 are then selected (step 404). For each of the selected payment accounts, the merchant account most strongly implicated by that payment account is identified (step 406), preferably using the procedure illustrated in FIG. 5.

Figure 5:
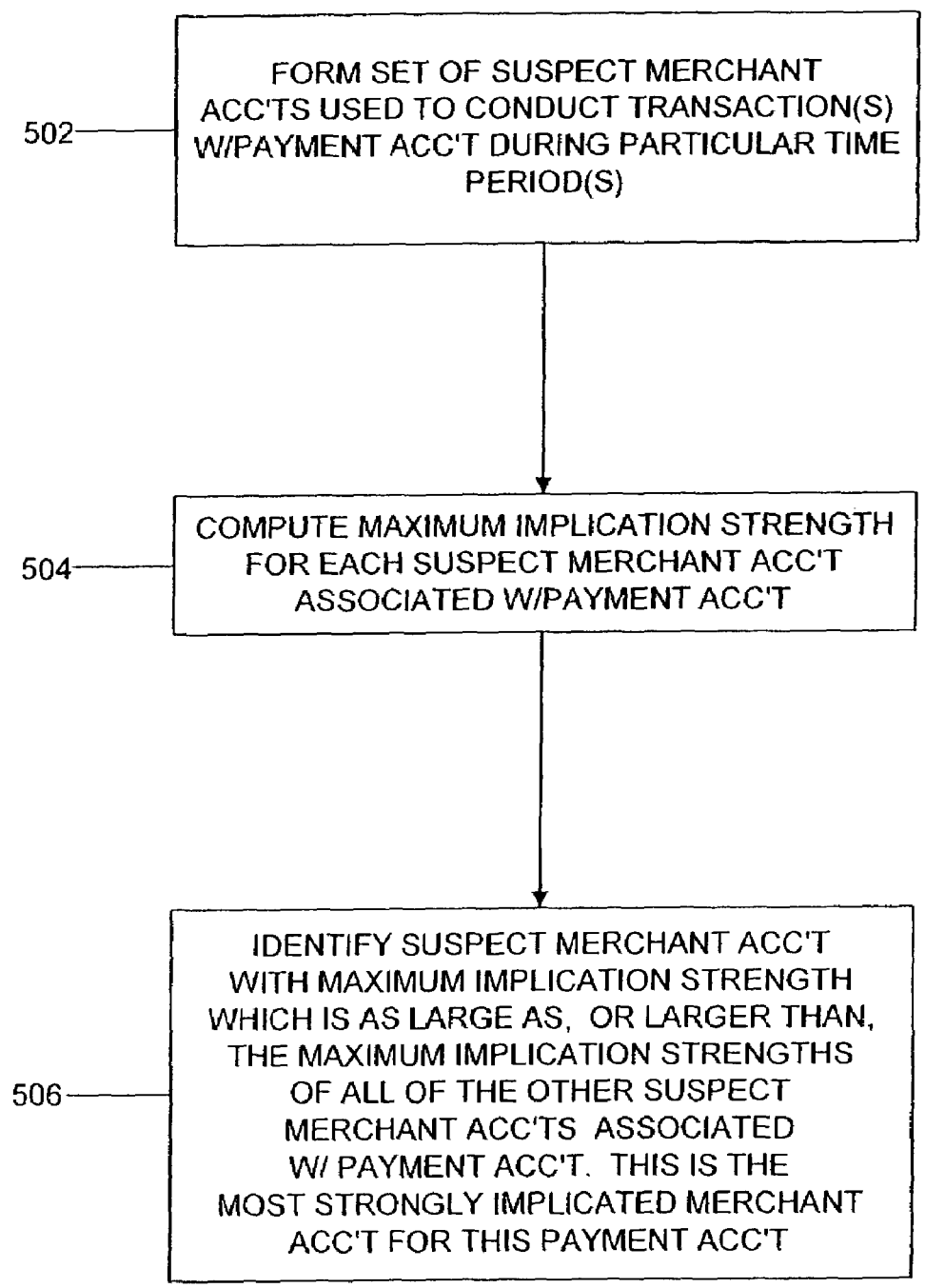
FIG. 5 is a flow diagram illustrating an exemplary procedure for selecting a most strongly implicated merchant account for use in the procedure illustrated in FIG. 4.

In the procedure illustrated in FIG. 5—which is used to process individually each payment account selected in step 404—all suspect merchant accounts implicated (in step 160, FIG. 1) by the payment account in a number (e.g., 21) of prior analysis cycles are identified and grouped into a set of suspect merchant accounts associated with that payment account (step 502). For example, consider the following scenario:

Merchant account M is included in the subset selected in step 402;

Account 1 implicates merchant account M and is therefore selected in step 404;

Account 1 was also used with merchant account P, which was identified as a suspect merchant account in an analysis performed 10 weeks ago;

The analysis performed 10 weeks ago estimated the time interval of compromise (i.e., the date range of valid transactions with the merchant account using payment accounts which implicated the merchant) for merchant account P as m1/d1/y1-m2/d2/y2;

Account 1 was used with merchant account P during the date range m1/d1/y1-m2/d2/y2;

Therefore, merchant account P may be a more likely point of compromise (for Account 1) than merchant account M.

For each merchant account associated with the payment account, the implication strengths from all relevant analysis cycles are computed, and the largest of these implication strengths—referred to herein as the "maximum implication strength" of the particular merchant—is determined (step 504). As is discussed above with respect to FIG. 3, implication strength (which typically varies among different analysis cycles) is preferably defined as $(pfrd-1)^2/(accts-1)$, where:

pfrd=# of pre-fraud accounts transacted at the merchant during the time interval of interest; and accts=total number of accounts transacted at the merchant on the dates, during the interval, on which the pre-fraud transactions were performed.

The procedure identifies the most strongly implicated merchant account for this payment account—the merchant account whose maximum implication strength is as large or larger than those of all other merchant accounts associated with this payment account (step 506).

For example, if payment account 1 was selected because it implicated only merchant account M, it is possible that M has the largest of the maximum implication strengths for payment account 1. However, it is also possible that a merchant identified in a prior analysis has a larger maximum implication strength.

Figure 6:
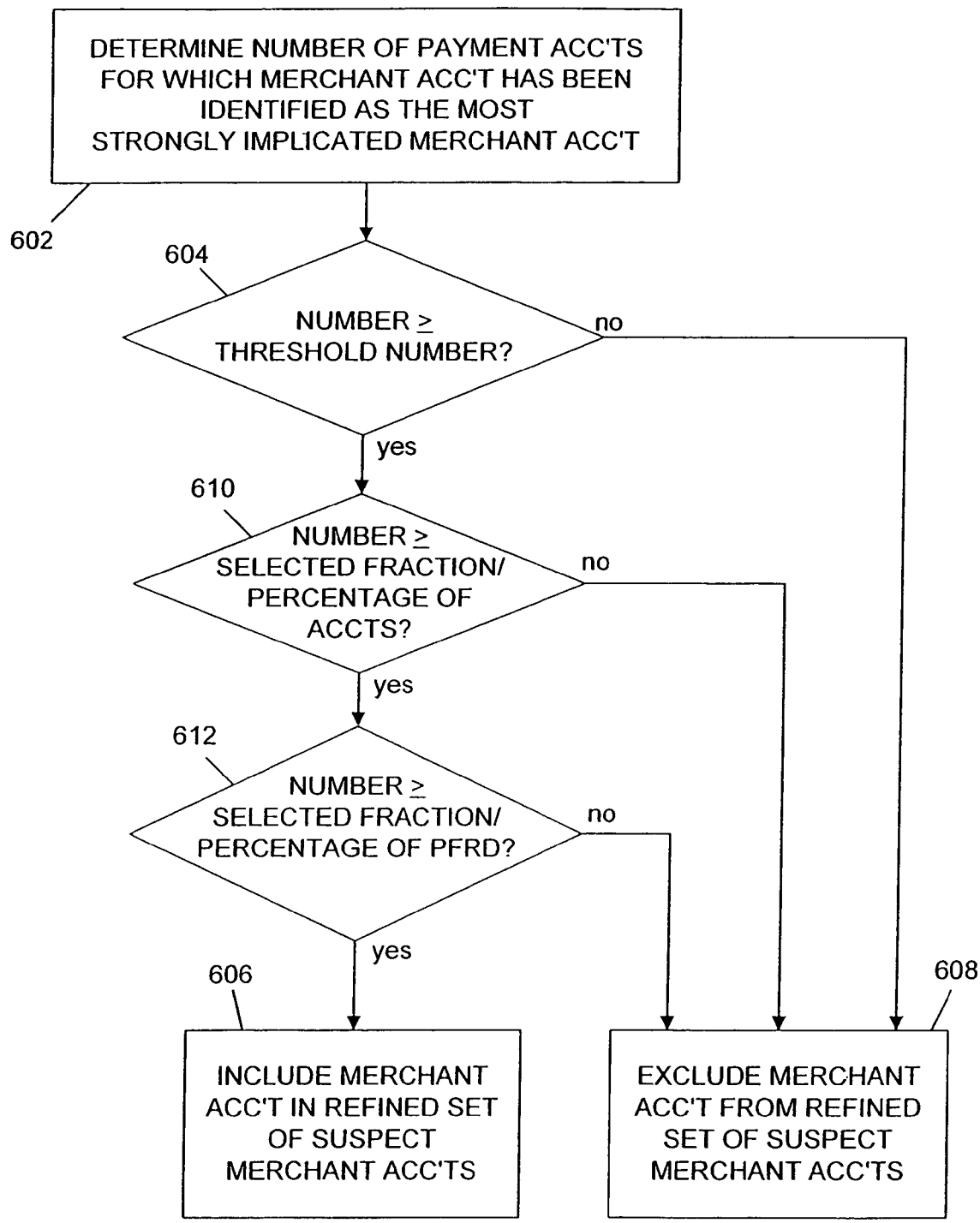
FIG. 6 is a flow diagram illustrating an additional exemplary procedure for refining a set of suspect merchant accounts in accordance with the present invention.

Referring again to the procedure illustrated in FIG. 4, a refined set of suspect merchant accounts is formed by selecting those merchant accounts that have been identified as the most strongly implicated accounts for at least a threshold number or percentage of pre-fraud accounts (step 408). To make the determination of whether a particular suspect merchant account is to be included in the refined set, the procedure illustrated in FIG. 6 is preferably used. In the procedure illustrated in FIG. 6, the number of payment accounts for which the merchant account has been identified as the most strongly implicated merchant account is determined (step 602). If the number is less than a threshold number (step 604), the merchant account is excluded from the refined set of suspect merchant accounts (step 608). Otherwise, the procedure continues with step 610. If, in step 610, it is determined that the number of payment accounts for which the merchant account has been identified as the most strongly implicated is less than a threshold fraction/percentage of accts—the number of accounts used to conduct transactions with the merchant on dates when pre-fraud transactions were performed—the merchant account is excluded from the refined set of suspect merchant accounts (step 608). Otherwise, the procedure moves on to step 612. If, in step 612, it is determined that the number of payment accounts for which the merchant account has been identified as the most strongly implicated is less than a threshold fraction/percentage of pfrd—the number of pre-fraud accounts used to conduct transactions with the merchant account—then the merchant account is excluded from the refined set of suspect merchant accounts (step 608). Otherwise, the merchant account is included in the refined set of suspect merchant accounts (step 606).

For example, the merchant account can be included in the refined set of suspect merchant accounts if one or more—preferable all—of the following conditions are satisfied:

the merchant account is the account most strongly implicated by 3 or more payment accounts;

the number of payment accounts for which the merchant account is the one most strongly implicated is not less than one percent of the total number of payment accounts transacted at the merchant on dates when pre-fraud transactions were performed (for the current analysis cycle); and/or the number of payment accounts for which the merchant account is the one most strongly implicated is not less than 80 percent of the number of pre-fraud accounts transacted at the merchant (for the current analysis cycle)

Any payment account which implicates one or more merchants identified in step 230 is viewed as having been most likely compromised at those merchants and, in the current cycle of analysis, will not be used as evidence that any other merchants might be points of compromise.

Figure 7:
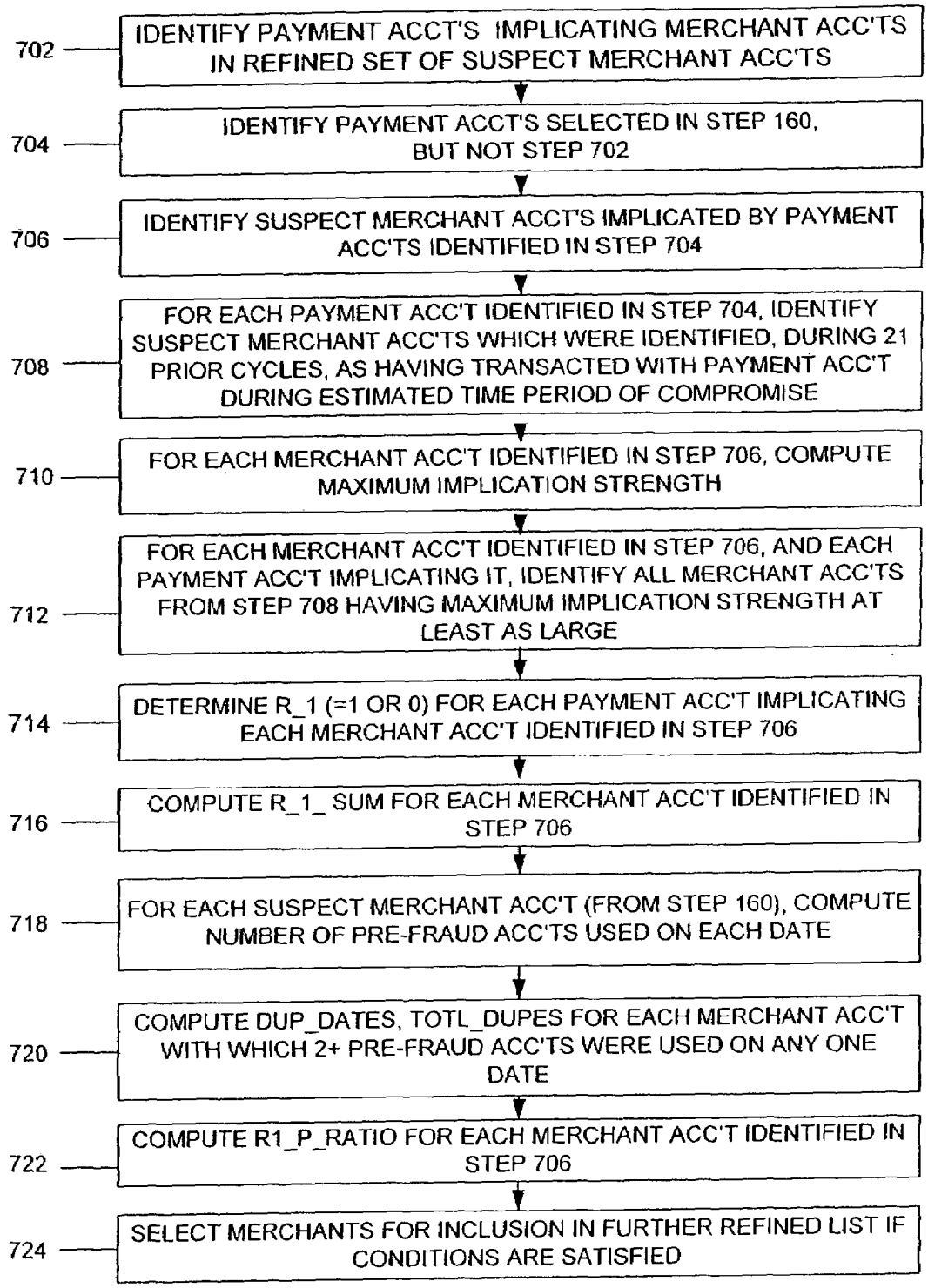
FIG. 7 is a flow diagram illustrating an exemplary procedure for further refining a set of suspect merchant accounts in accordance with the present invention.

Referring again to FIG. 2, once the refined set of suspect merchant accounts has been selected (step 230), further consideration can be given to merchant accounts listed in step 160 or step 220 but omitted from the refined set in 230. Step 240 selects these additional merchant accounts for further consideration. Similarly to the approach used in step 230—discussed above—in the approach of step 240, for each payment account implicating multiple merchant accounts, the respective implication strengths of the merchant accounts are compared. Optionally, the merchant accounts whose implication strength are being compared can include those listed in step 160 during prior analysis cycles. FIG. 7 illustrates an exemplary procedure for use as step 240. The illustrated procedure first identifies all payment accounts which implicate merchant accounts in the refined set of suspect merchant accounts formed in step 408 illustrated in FIG. 4 (step 702). All payment accounts that were selected in step 160 (FIG. 1), but not in step 702, are now selected (step 704). Merchant accounts in the set of suspect merchant accounts that are implicated by the payment accounts selected in step 704 are identified (step 706). For each payment account identified in step 704, step 708 identifies all suspect merchant accounts that were identified during a number (e.g., 21) of prior analysis cycles (from step 160, FIG. 1) as having transacted with the payment account during the respective estimated time frames of compromise for those merchant accounts. For each merchant listed in step 706, the maximum implication strength from all relevant analysis cycles is computed (step 710), using the same formula discussed above with respect to step 504. For each merchant identified in step 706 and each payment account which implicates it, the procedure identifies all merchants that were associated with the payment account in step 708 and which have a maximum implication strength at least as large as that of the merchant identified in step 706 (step 712). If the merchant account identified in step 706 has the largest maximum implication strength (without a tie between merchants), then it will be the only merchant account selected for the specified payment account in step 712. In many cases, a number of other merchants identified in step 708 for the particular payment account may have larger maximum implication strengths.

For each merchant account identified in step 706 and each payment account implicating it, the variable $R\_1$ is defined as 1 if this is the only merchant account selected in step 712, and as 0 otherwise (step 714). For each suspect merchant identified in step 706, the sum $R\_1\_sum$ of the values $R\_1$ determined in step 714 for the respective implicating payment accounts is computed (step 716). For each suspect merchant account selected in step 160, and for each date on which one or more pre-fraud payment accounts was transacted there, the numbers of pre-fraud payment accounts transacted on the respective dates is computed (step 718). For each merchant at which two or more pre-fraud payment accounts were transacted on at least one date, the following values are computed (step 720):

Dup_dates=number of dates on which two or more pre-fraud accounts were transacted;

Totl_dupes=sum (over all dates on which two or more pre-fraud accounts were transacted) of the number of pre-fraud accounts transacted on each date.

For each merchant identified in step 706, the following value is computed (step 722): $R1\_p\_ratio=(R\_1\_sum)/(pfrd)$. In step 724, a merchant account is selected for the set of additional merchant accounts under the following conditions:

If Pfrd=3: $Totl\_dupes \geq 3$;

If Pfrd=4 or 5: $R\_1\_sum \geq 2$ and $R\_1\_p\_ratio \geq 0.5$;

If Pfrd$\geq 6$:

$R\_1\_sum \geq 3$;

$R1\_P\_ratio \geq 0.3$; and $Tot1\_dupes \geq 3$ or $R1\_p\_ratio \geq 0.5$.

While the present invention has been described with regard to identifying suspect merchants and merchant accounts based on a set of accounts reported by issuers to have been used in fraudulent transactions, other well-defined sets of accounts may also be used as the basis for identifying such merchants. For example, consider a criminal enterprise in which skimmed account data are used at sham "bust-out" merchants established for the sole purpose of conducting transactions with the stolen account data. In this case, the set of all accounts transacted at new merchants can be used to perform the analysis.

It will be appreciated by those skilled in the art that the methods of FIGS. 1-7 can be implemented on various standard computer platforms operating under the control of suitable software defined by FIGS. 1-7. In some cases, dedicated computer hardware, such as a peripheral card in a conventional personal computer, can enhance the operational efficiency of the above methods.

Figure 8:
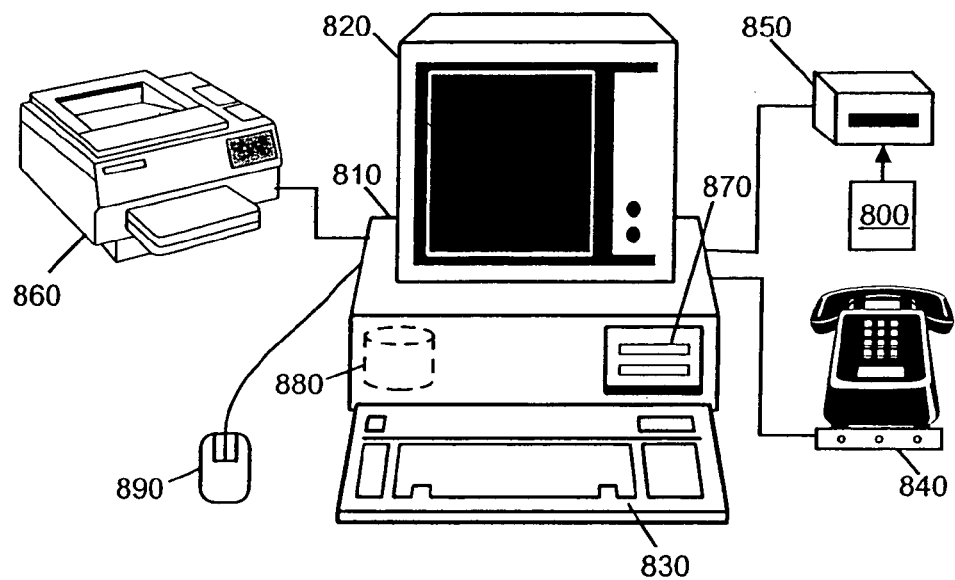
FIG. 8 is a diagram illustrating an exemplary computer system for performing the procedures illustrated in FIGS. 1-7.
Figure 9:
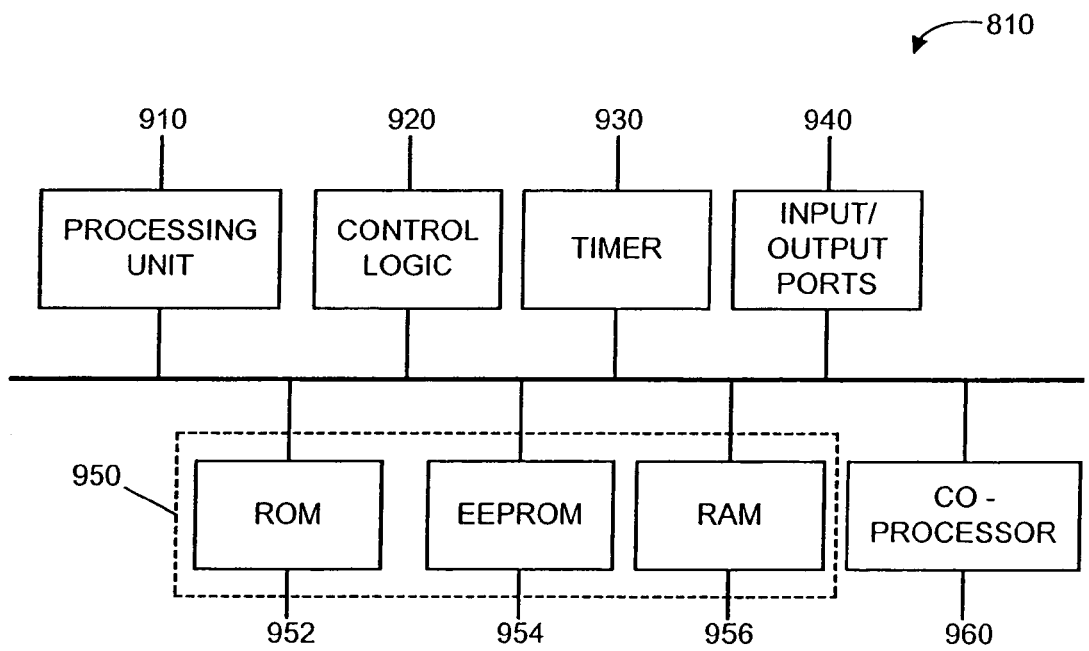
FIG. 9 is a block diagram illustrating an exemplary processing section for use in the computer system illustrated in FIG. 8.

FIGS. 8 and 9 illustrate typical computer hardware suitable for performing the methods of the present invention. Referring to FIG. 8, the computer system includes a processing section 810, a display 820, a keyboard 830, and a communications peripheral device 840 such as a modem. The system typically includes a digital pointer 890 such as a "mouse," and can also include other input devices such as a card reader 850 for reading an account card 800. In addition, the system can include a printer 860. The computer system typically includes a hard disk drive 880 and one or more additional disk drives 870 which can read and write to computer readable media such as magnetic media (e.g., diskettes or removable hard disks), or optical media (e.g., CD-ROMS or DVDs). The disk drives 870 and 880 are used for storing data and application software.

FIG. 9 is a functional block diagram which further illustrates the processing section 810. The processing section 810 generally includes a processing unit 910, control logic 920, and a memory unit 950. Preferably, the processing section 810 also includes a timer 930 and input/output ports 940. The processing section 810 can also include a co-processor 960, depending on the microprocessor used in the processing unit. Control logic 920 provides, in conjunction with processing unit 910, the control necessary to handle communications between memory unit 950 and input/output ports 940. Timer 930 provides a timing reference signal for processing unit 910 and control logic 920. Co-processor 960 provides an enhanced ability to perform complex computations in real time, such as those required by cryptographic algorithms.

Memory unit 950 can include different types of memory, such as volatile and non-volatile memory and read-only and programmable memory. For example, as shown in FIG. 9, memory unit 950 can include read-only memory (ROM) 952, electrically erasable programmable read-only memory (EEPROM) 954, and random-access memory (RAM) 956. Different computer processors, memory configurations, data structures and the like can be used to practice the present invention, and the invention is not limited to a specific platform.

Software defined by FIGS. 1-7 can be written in a wide variety of programming languages, as will be appreciated by those skilled in the art. Exemplary software algorithms in accordance with the present invention have been written in the SAS programming language. The computer source code for exemplary SAS algorithms is provided in the computer program listing appendix filed herewith.

Although the present invention has been described in connection with specific exemplary embodiments, it should be understood that various changes, substitutions, and alterations can be made to the disclosed embodiments without departing from the spirit and scope of the invention as set forth in the appended claims.

What is claimed is:

1. A method for of identifying merchants at which payment accounts have been compromised on a financial transaction network, the merchants having associated merchant accounts stored in at least a first database on said financial transaction network, the method comprising:

determining a first number of pre-fraud payment accounts used to conduct one or more transactions with at least a first merchant account using a processor;

determining whether the first number is no less than a first threshold number;

determining a second number of pre-fraud payment accounts used to conduct one or more pre-fraud transactions with the first merchant account during a first time period, the one or more pre-fraud transactions having been conducted on one or more dates using a processor;

determining a third number of payment accounts used to conduct one or more transactions with the first merchant account on the one or more dates using a processor;

determining whether a first fraction is no less than a threshold fraction, the first fraction comprising the second number divided by the third number;

a conditional step of selecting the first merchant account for inclusion in a first set of suspect merchant accounts if a plurality of conditions are satisfied, the plurality of conditions comprising the following conditions: (a) the first number is no less than the first threshold number, and (b) the first fraction is no less than the threshold fraction;

and identifying merchants having associated accounts in the first set of suspect merchant accounts as likely merchants at which payment accounts have been compromised;

selecting a subset of suspect merchant accounts from one or more sets of suspect merchant accounts, the one or more sets of suspect merchant accounts including the first set of suspect merchant accounts, each merchant account of the subset having associated therewith a number of pre-fraud payment accounts used to conduct one or more transactions with only the merchant account of the subset, the number of pre-fraud payment accounts used to conduct one or more transactions with only the merchant account of the subset being no less than a second threshold number;

selecting a plurality of pre-fraud payment accounts, each payment account of the plurality of pre-fraud payment accounts having been used to conduct one or more transactions with at least one merchant account of the subset;

performing, using a processor, the following steps for each payment account of the plurality of pre-fraud payment accounts:

including, in a set of suspect merchant accounts associated with the payment account, all merchant accounts of the one or more sets of suspect merchant accounts that were used to conduct one or more transactions with the payment account during at least one time period, the at least one time period including the first time period, for each merchant account of the set of suspect merchant accounts associated with the payment account, computing a maximum implication strength, using a processor, of a set of one or more implication strengths, each implication strength of the set of one or more implication strengths comprising $$\frac{(pfrd-1)^2}{accts-1},$$

wherein pfrd equals a number of pre-fraud payment accounts used to conduct, on a set of one or more dates associated with the implication strength, one or more transactions with the merchant account of the set of merchant accounts associated with the payment account, wherein accts equals a number of payment accounts used to conduct, on the set of one or more dates associated with the implication strength, one or more transactions with the merchant account of the set of suspect merchant accounts associated with the each payment account, and identifying a most strongly implicated merchant account for the payment account, the most strongly implicated merchant account having a maximum implication strength which is at least as large as the maximum implication strengths of all other merchant accounts of the set of suspect merchant accounts associated with the payment account; and performing, using a processor, the following steps for each merchant account of the subset:

determining a number of payment accounts of the plurality of pre-fraud payment accounts for which the merchant account of the subset has been identified as the most strongly implicated merchant account, and including the merchant account of the subset in a refined set of suspect merchant accounts if one or more conditions are satisfied, the one or more conditions comprising at least one of the following conditions: (a) the number of payment accounts for which the merchant account has been identified as the most strongly implicated merchant account is no less than a third threshold number, (b) the number of payment accounts for which the merchant account has been identified as the most strongly implicated merchant account is no less than a selected fraction of accts, and (c) the number of payment accounts for which the merchant account has been identified as the most strongly implicated merchant account is no less than a selected fraction of pfrd.

2. A method according to claim 1, further comprising computing an implication strength associated with the first merchant account using a processor, the implication strength comprising $$\frac{(pfrd-1)^2}{accts-1},$$

wherein pfrd comprises the second number, wherein accts comprises the third number, the plurality of conditions further comprising the following condition: the implication strength is no less than a threshold value.

3. A method according to claim 2, further comprising determining whether at least one of the pre-fraud payment accounts used to conduct one or more transactions with the first merchant account was also used to conduct one or more transactions with a second merchant account using a processor, the second merchant account having been included in a second set of suspect merchant accounts before the conditional step of selecting the first merchant account, the first merchant account being excluded from the first set of suspect merchant accounts if the following conditions are satisfied: (c) the at least one of the pre-fraud payment accounts used to conduct one or more transactions with the first merchant account was also used to conduct one or more transactions with the second merchant account, and (d) the second merchant account was included in the second set of suspect merchant accounts before the conditional step of selecting the first merchant account.

4. A method according to claim 1, further comprising determining whether at least one of the pre-fraud payment accounts used to conduct one or more transactions with the first merchant account was also used to conduct one or more transactions with a second merchant account using a processor, the second merchant account having been included in a second set of suspect merchant accounts before the conditional step of selecting the first merchant account, the first merchant account being excluded from the first set of suspect merchant accounts if the following conditions are satisfied: (c) the at least one of the pre-fraud payment accounts used to conduct one or more transactions with the first merchant account was also used to conduct one or more transactions with the second merchant account, and (d) the second merchant account was included in the second set of suspect merchant accounts before the conditional step of selecting the first merchant account.

5. A computer-readable medium for assisting identification of merchants at which payment accounts have been compromised on a financial transaction network, the computer-readable medium having a set of instructions executable by a processor to perform the steps of:

determining a first number of pre-fraud payment accounts used to conduct one or more transactions with at least a first merchant account stored in at least a first database on said financial transaction network;

determining whether the first number is no less than a first threshold number;

determining a second number of pre-fraud payment accounts used to conduct one or more pre-fraud transactions with the first merchant account during a first time period, the one or more pre-fraud transactions having been conducted on one or more dates;

determining a third number of payment accounts used to conduct one or more transactions with the first merchant account on the one ore more dates;

determining whether a first fraction is no less than a threshold fraction, the first fraction comprising the second number divided by the third number; and a conditional step of selecting the first merchant account for inclusion in a first set of suspect merchant accounts if a plurality of conditions are satisfied, the plurality of conditions comprising the following conditions: (a) the first number is no less than the first threshold number, and (b) the first fraction is no less than the threshold fraction;

selecting a subset of suspect merchant accounts from one or more sets of suspect merchant accounts, the one or more sets of suspect merchant accounts including the first set of suspect merchant accounts, each merchant account of the subset having associated therewith a number of pre-fraud payment accounts used to conduct one or more transactions with only the merchant account of the subset, the number of pre-fraud payment accounts used to conduct one or more transactions with only the merchant account of the subset being no less than a second threshold number; selecting a plurality of pre-fraud payment accounts, each payment account of the plurality of pre-fraud payment accounts having been used to conduct one or more transactions with at least one merchant account of the subset;

performing the following steps for each payment account of the plurality of pre-fraud payment accounts:

including, in a set of suspect merchant accounts associated with the payment account, all merchant accounts of the one or more sets of suspect merchant accounts that were used to conduct one or more transactions with the payment account during at least one time period, the at least one time period including the first time period, for each merchant account of the set of suspect merchant accounts associated with the payment account, computing a maximum implication strength of a set of one or more implication strengths, each implication strength of the set of one or more implication strengths comprising $$\frac{(pfrd-1)^2}{accts-1},$$

wherein pfrd equals a number of pre-fraud payment accounts used to conduct, on a set of one or more dates associated with the implication strength, one or more transactions with the merchant account of the set of merchant accounts associated with the payment account, wherein accts equals a number of payment accounts used to conduct, on the set of one or more dates associated with the implication strength, one or more transactions with the merchant account of the set of suspect merchant accounts associated with the each payment account, and identifying a most strongly implicated merchant account for the payment account, the most strongly implicated merchant account having a maximum implication strength which is at least as large as the maximum implication strengths of all other merchant accounts of the set of suspect merchant accounts associated with the payment account; and performing, the following steps for each merchant account of the subset:

determining a number of payment accounts of the plurality of pre-fraud payment accounts for which the merchant account of the subset has been identified as the most strongly implicated merchant account, and including the merchant account of the subset in a refined set of suspect merchant accounts if one or more conditions are satisfied, the one or more conditions comprising at least one of the following conditions: (a) the number of payment accounts for which the merchant account has been identified as the most strongly implicated merchant account is no less than a third threshold number, (b) the number of payment accounts for which the merchant account has been identified as the most strongly implicated merchant account is no less than a selected fraction of accts, and (c) the number of payment accounts for which the merchant account has been identified as the most strongly implicated merchant account is no less than a selected fraction of pfrd.

6. A computer-readable medium according to claim 5, wherein the set of instructions is further operable to direct the processor to compute an implication strength associated with the first merchant account, the implication strenth comprising $$\frac{(pfrd - 1)^2}{accts - 1},$$

wherein pfrd comprises the second number, wherein accts comprises the third number, the plurality of conditions further comprising the following condition: the implication strength is no less than a threshold value.

7. A computer-readable medium according to claim 6, wherein the set of instructions is further operable to direct the processor to perform the step of determining whether at least one of the pre-fraud payment accounts used to conduct one or more transactions with the first merchant account was also used to conduct one or more transactions with a second merchant account, the second merchant account having been included in a second set of suspect merchant accounts before the conditional step of selecting the first merchant account, the first merchant account being excluded from the first set of suspect merchant accounts if the following conditions are satisfied: (c) the at least one of the pre-fraud payment accounts used to conduct one or more transactions with the first merchant account was also used to conduct one or more transactions with the second merchant account, and (d) the second merchant account was included in the second set of suspect merchant accounts before the conditional step of selecting the first merchant account.

8. A computer-readable medium according to claim 5, wherein the set of instructions is further operable to direct the processor to perform the step of determining whether at least one of the pre-fraud payment accounts used to conduct one or more transactions with the first merchant account was also used to conduct one or more transactions with a second merchant account, the second merchant account having been included in a second set of suspect merchant accounts before the conditional step of selecting the first merchant account, the first merchant account being excluded from the first set of suspect merchant accounts if the following conditions are satisfied: (c) the at least one of the pre-fraud payment accounts used to conduct one or more transactions with the first merchant account was also used to conduct one or more transactions with the second merchant account, and (d) the second merchant account was included in the second set of suspect merchant accounts before the conditional step of selecting the first merchant account.

* * * * *

UNITED STATES PATENT AND TRADEMARK OFFICE
CERTIFICATE OF CORRECTION

| | | |
|---|---|---|
| PATENT NO. | : 7,580,891 B2 | Page 1 of 1 |
| APPLICATION NO. | : 10/339847 | |
| DATED | : August 25, 2009 | |
| INVENTOR(S) | : Victor Franklin Klebanoff | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1588 days.

Signed and Sealed this

Fourteenth Day of September, 2010

David J. Kappos
*Director of the United States Patent and Trademark Office*